United States Patent [19]
Desty et al.

[11] 3,914,089
[45] Oct. 21, 1975

[54] DISTRIBUTOR PLATE

[75] Inventors: Denis Henry Desty, Weybridge; Howard Cervase Lunn, Camberley, both of England

[73] Assignee: The British Petroleum Company Limited, London, England

[22] Filed: Jan. 17, 1973

[21] Appl. No.: 324,401

[30] Foreign Application Priority Data
Jan. 26, 1972 United Kingdom................ 3611/72
Jan. 26, 1972 United Kingdom................ 3612/72

[52] U.S. Cl. ..................... 431/7; 34/57; 431/170; 431/328
[51] Int. Cl.² ......................................... F23D 19/00
[58] Field of Search ......... 431/7, 170, 328; 432/58, 432/14, 15; 34/57 A

[56] References Cited
UNITED STATES PATENTS

| | | | |
|---|---|---|---|
| 728,098 | 5/1903 | Greer | 431/170 |
| 755,377 | 3/1904 | Lucke | 431/7 |
| 1,216,096 | 2/1917 | Ellis | 431/170 |
| 2,227,899 | 1/1941 | Grubb | 431/328 |
| 2,607,666 | 8/1952 | Martin | 34/57 A |
| 3,598,374 | 10/1971 | Nauta | 34/57 A |

FOREIGN PATENTS OR APPLICATIONS
1,227,347  4/1971  United Kingdom................ 431/328

Primary Examiner—Carroll B. Dority, Jr.
Assistant Examiner—Larry I. Schwartz
Attorney, Agent, or Firm—Morgan, Finnegan, Pine, Foley & Lee

[57] ABSTRACT

A distributor plate for a fluidised bed furnace comprises a plurality of air tubes passing through a gas chamber and an oil chamber, both of which are fitted with inlets. The air tubes pass through and beyond the chambers, are perforated where they pass through the chambers, and terminate in heads which supply a combustible mixture to the fluidised bed furnace.

8 Claims, 3 Drawing Figures

DISTRIBUTOR PLATE

This invention relates to a fluidised bed furnace.

A fluidised bed furnace is operated by blowing a combustible mixture of air and a fuel through a bed of a refractory particulate material to maintain the bed in a fluidised state. The fuel, which may be solid, liquid or gaseous, or a mixture, burns within the bed which is thereby maintained at an elevated temperature, e.g. in the range 700° – 1,800°C.

Fluidised bed furnaces are difficult to ignite if only liquid and/or solid fuels are employed and for this reason a supply of gas is usually provided for the start-up procedure. A suitable method of lighting a fluidised bed furnace is given in our British Pat. Specification No. 1,159,310.

Fluidised bed furnaces are capable of very high heat outputs and good heat transfer characteristics.

Difficulties, however, have sometimes been encountered in supplying liquid fuels, such as fuel oil to fluidised bed furnaces, since there is a tendency for supply nozzles to become blocked, and the combustion characteristics can be very sensitive to fuel distribution.

We have now invented a novel "climbing film" distributor plate for supplying liquid fuel to a fluidised bed which is less susceptible to blockage than previous supply systems and gives a more uniform distribution of fuel across the whole area of the fluidised bed.

According to the invention there is provided a distributor plate suitable for use with a fluidised bed furnace which plate comprises a chamber fitted with fuel gas and oil inlets and a plurality of air tubes passing through said chamber, the interior of said air tubes being in communication with the chamber by means of holes and one end of the air tubes terminating in heads having outlets adapted to supply a combustible mixture to a fluidised bed furnace. In use, a fluidising gas containing oxygen passing along the air tubes causes oil admitted to the interior of the air tubes from the chamber to climb along the internal wall of the air tubes and to pass through the heads of the air tubes into a fluidised bed furnace.

Preferably the chamber is divided into a fuel gas chamber and an oil chamber, both of which chambers being in communication by means of holes with the air tubes.

Prolonged operation of the fluidised bed furnace shows that the static bed material immediately below the air/oil outlets become saturated with the fuel oil and a sintered accumulation tends to spread upwards into the fluidisation zone.

Preferably the distributor plate has some air tubes that extend for a shorter distance away from the chamber than the other air tubes, the interior of which shorter air tubes are in communication with the fuel gas chamber only.

Preferably 10 – 30% of the total number of air tubes are in communication with the fuel gas chamber only.

If desired, a third chamber may be fitted above the gas and oil chambers and used for cooling purposes.

In use, a blast of air passes through the air tubes and entrains gas or gas and oil through the holes and sweeps them into the fluidised bed combustion zone.

The passage of gas from the gas chamber into the air tube is restricted to control the gas distribution since the gas flow should be approximately equal to all tubes.

It is also important that the flow of oil from the oil chamber into the tubes to which oil is supplied is approximately equal for each tube. Suitable flow control devices include weirs, orifices and porous walled tubes. The flow rate is adjusted so as to yield a climbing film along the interior wall of the air tubes.

Preferably the oil chamber is divided into a plurality of segments, each segment having an oil inlet and at least one oil outlet, said outlet communicating by means of a hole or holes with an air tube.

The head of the air tubes can be of any suitable shape. The area of these heads should be designed to give good distribution of fuel and air. The particular design will be dependent upon the individual characteristics of the solid being fluidised.

The bed itself comprises mineral particles of a size range and bulk density appropriate to the velocity of the fluidising gas. Suitable materials include sand, dolomite and limestone.

The tube density can be varied to suit particular circumstances and process requirements. In general, a tube density of 10 – 30 tubes per square foot will be found to be suitable.

The total cross-sectional area of the outlets of the tube heads is preferably 1½ – 3% of the total area of the plate.

The outlets of the tube heads form passageways through the side of the air tube, the direction of the passageways being substantially perpendicular to the wall of the air tube.

According to a further aspect of the invention there is provided a method of burning oil in a fluidised bed wherein a fluidising gas containing oxygen is passed into a fluidised bed in a reactor through at least one air tube, said air tube having oil admission means, situated below the bed and wherein said fluidising gas causes a film of oil admitted through said oil admission means to climb up the inside wall of the air tubes and to pass into the fluidised bed through outlet holes of the air tube and to be burned in said fluidised bed.

The invention is illustrated with reference to FIGS. 1 – 3 of the drawings accompanying the specification.

Figure 1:
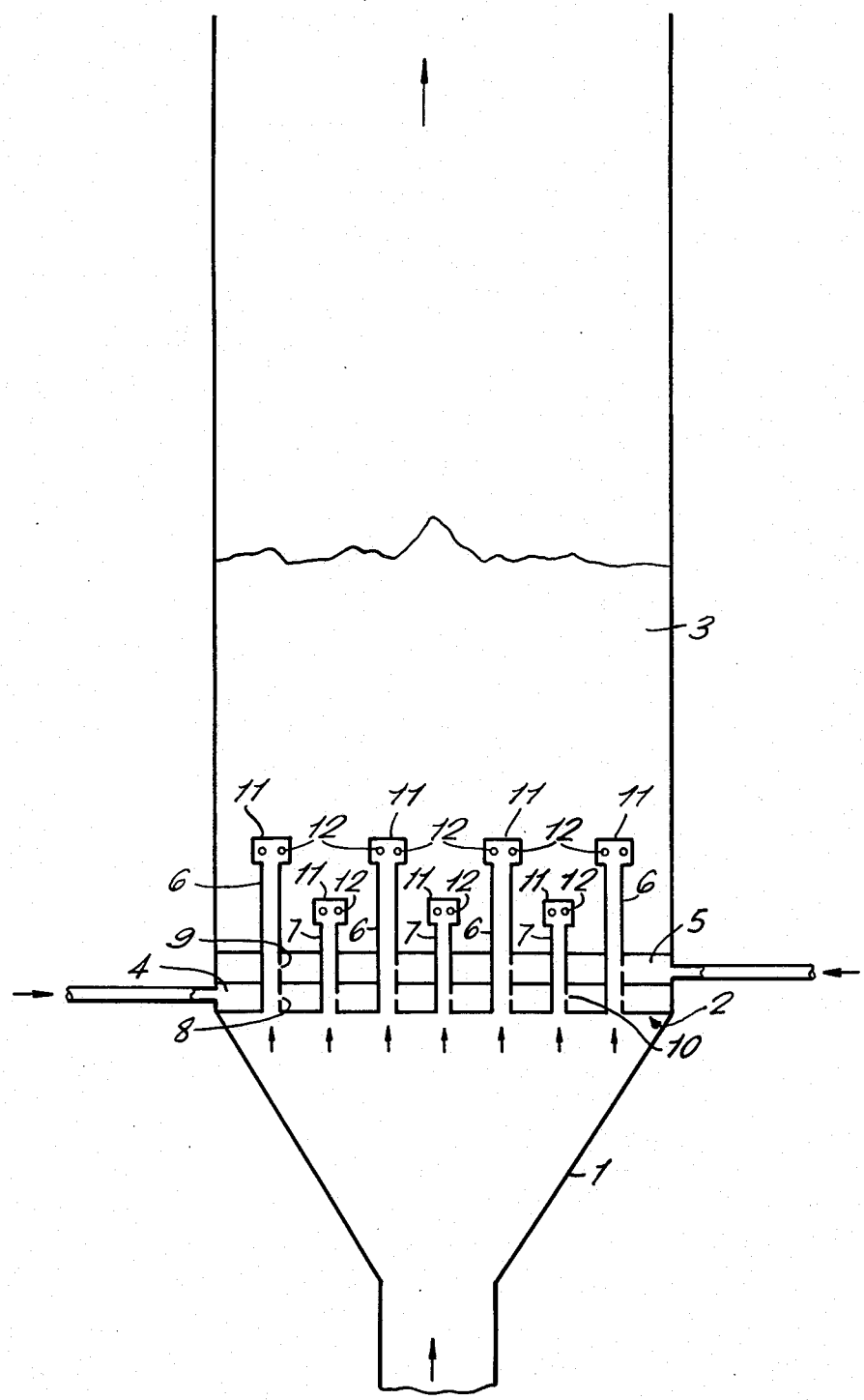
FIG. 1 is a schematic diagram of a fluidised bed furnace incorporating a distributor plate according to the invention.

The fluidised bed furnace comprises a plenum chamber 1, a distributor plate 2 and a fluidised bed 3 of sand of mesh size 10/30 mesh and bulk density of 80–100 pounds per cubic foot. The bed 3 is situated within a 4 foot diameter mild steel shell which is surrounded by a water jacket.

The plate 2 comprises a gas chamber 4, an oil chamber 5 and a number of air tubes 6 and 7. Tubes 6 are longer than tubes 7 and have apertures 8 and 9 communicating with gas chamber 4 and oil chamber 5 respectively. Tubes 7 have apertures 10 communicating with gas chamber 4. Tubes 6 and 7 terminate in outlets 11 within the fluidised bed 3 having further apertures 12. A fan (not shown) is positioned downstream of the plate 2 and plenum chamber 1.

| Distributor Plate Data (FIG. 3) | |
|---|---|
| Diameter of plate | 4 feet |
| Width of gas and oil chambers | 2½ inches |
| Number of air tubes | 200 |
| Length of air tubes | 5 inches |
| Length of air tubes also carrying oil | 8½ inches |
| Diameter of air tubes | 5/8 inch O.D. 1/2 inch I.D. |
| Diameter of oil inlet holes | 3/32 inch |
| Diameter of gas inlet holes | 3/32 inch |
| Number of gas/oil inlet holes per air tube | 4 |
| Number of outlet holes/air tube | 4 |
| Typical air flow velocity | 50 feet/sec. |

Oil viscosity at point of entry into air tube 30-75 centistokes.

Figure 2:
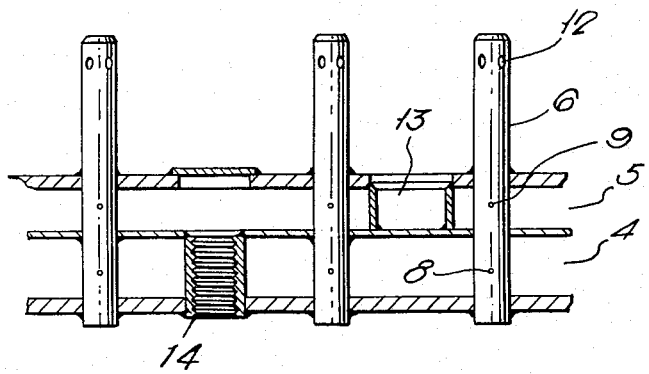
FIG. 2 shows a section through a distributor plate showing the division plates of the oil chamber.
Figure 3:
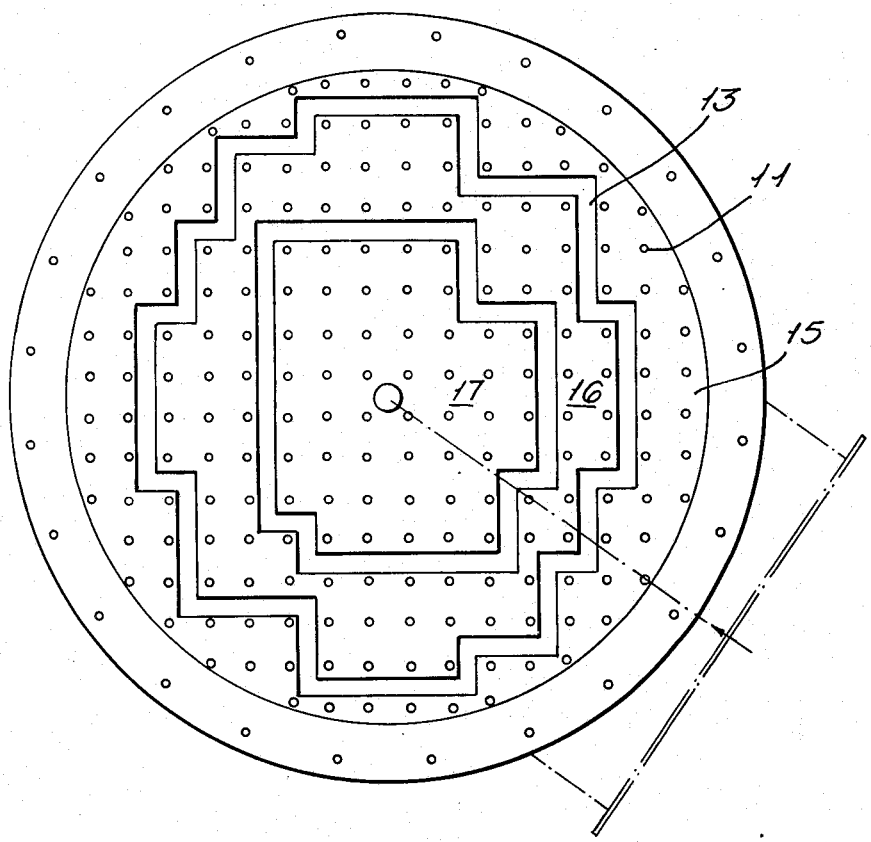
FIG. 3 shows a plan view of a distributor plate illustrating an example of sub-division of the oil chamber so as to improve oil distribution.

FIGS. 2 and 3 show the construction of a modified oil chamber. The chamber is divided into three approximately equal areas 15, 16, 17 by element 13, each area having a separate oil feed to the chamber. The central area 17 enclosed 49 air tubes, area 16 enclosed 77 air tubes and peripheral area 15 enclosed the remaining 74 air tubes. There are a total of six oil feed connections from the main feed connection (not shown) to the three segments, i.e., two connections to each segment one of which is shown at 14 in FIG. 2.

In order to light the furnace, air is passed into the plenum chamber 1 by means of a fan (not shown) and then through the tubes 6 and 7 at a rate determined by the combustion conditions. Fuel gas e.g. propane is supplied to the gas chamber 4 and is subsequently mixed with air passing through tubes 6 and 7. Thus a pre-mixed propane/air supply is supplied to the furnace bed 3. Ignition of the combustible mixture was either electrically or by means of a naked flame.

Generally only about 15 minutes is required after ignition to reach normal bed operating conditions circa 800°C. When these conditions are attained, the fuel gas supply is gradually reduced and the oil feed supply is switched in. Oil is fed to the oil chamber 5 at a rate compatible with the air rate. The oil then trickles through supply hole 9 into the interior of air tube 6. The air passing along tubes 6 causes the oil to form a climbing film along the inside wall of tubes 6. Thus the oil eventually reaches the outlet holes 12 of the air tubes and is consumed in the fluidised bed.

The viscosity of the oil in the oil chamber 5 may be controlled by a heater (not shown).

We claim:

1. A method of burning oil in a fluidised bed, comprising the steps of:
   positioning at least one tube below the fluidised bed for communication with the fluidised bed at one end;
   continuously introducing oil in liquid form directly onto the inside wall of the tube at a point intermediate its length to form a film thereon; and
   continuously introducing a fluidizing gas containing oxygen into the tube at a point below the point of introduction of the oil and passing the fluidised gas through the tube to cause the film of oil to climb up the inside wall of the tube and communicate with the fluidised bed for burning thereon.

2. A distributor plate for a fluidised bed comprising a fuel gas chamber including a fuel gas inlet, an oil chamber including an oil inlet, and a plurality of air tubes passing through the chambers, all of the air tubes including apertures for communication between the interior of the air tubes and the fuel gas inlet, at least some of the air tubes including additional apertures for communication between the oil inlet and the interior of the air tubes, some of the air tubes being shorter in length than the remaining air tubes, the shorter air tubes being arranged so that their interiors are only in communication with the fuel gas chamber, one end of the air tubes terminating in heads having outlet means adapted to supply a combustible mixture to the fluidised bed.

3. A distributor plate for a fluidised bed according to claim 2 in which about 10 to 30% of the total number of air tubes are the shorter air tubes which are in communication with the fuel gas chamber only.

4. A distributor plate for a fluidised bed comprising a fuel gas chamber including a fuel gas inlet, an oil chamber divided into a plurality of segments, each of the segments having separate oil inlet means, and a plurality of air tubes passing through the chambers, all of the air tubes including apertures for communication between the interior of the air tubes and the fuel gas inlet, at least some of the air tubes including additional apertures for communication between the oil inlet means of their respective segment and the interior of the air tubes, one end of the air tubes terminating in heads having outlet means adapted to supply a combustible mixture to the fluidised bed.

5. A distributor plate for a fluidised bed comprising a fuel gas chamber including a fuel gas inlet, an oil chamber including an oil inlet, and a plurality of air tubes passing through the chambers, all of the air tubes including apertures for communication between the interior of the air tubes and the fuel gas inlet, at least some of the air tubes including additional apertures for communication between the oil inlet and the interior of the air tubes, one end of the air tubes terminating in heads having outlet means adapted to supply a combustible mixture to the fluidised bed, the outlet means including passageways substantially perpendicular to the sidewall of the air tubes.

6. A distributor plate for a fluidised bed according to claim 5 in which the total cross-sectional area of the passageways of the outlet means is from about 1½ to 3% about of the total area of the plate.

7. A distributor plate for a fluidised bed comprising a fuel gas chamber including a fuel gas inlet, an oil chamber including an oil inlet, and a plurality of air tubes passing through the chambers, all of the air tubes including apertures in their sidewalls for communication between the fuel gas chamber and the interior of the air tubes, at least some of the air tubes also including apertures in their sidewalls for communication between the oil chamber and the interior of the air tubes, one end of the air tubes terminating in heads having outlet means for supplying a combustible mixture to the fluidised bed.

8. A distributor plate for a fluidised bed according to claim 7 wherein there are between about 10 and about 30 air tubes per square foot of the plate.

* * * * *